(12) United States Patent
Kulakowski et al.

(10) Patent No.: US 8,997,730 B2
(45) Date of Patent: Apr. 7, 2015

(54) GREASE HANDLING APPARATUS FOR CLOSED SYSTEM OVEN

(75) Inventors: Joseph Kulakowski, Milwaukee, WI (US); Jan Bartelick, Germantown, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 381 days.

(21) Appl. No.: 13/306,687

(22) Filed: Nov. 29, 2011

(65) Prior Publication Data

US 2013/0133638 A1    May 30, 2013

(51) Int. Cl.
*F24C 15/00* (2006.01)
*B01D 17/02* (2006.01)
*F24C 15/32* (2006.01)

(52) U.S. Cl.
CPC .......... *B01D 17/0208* (2013.01); *F24C 15/327* (2013.01)

(58) Field of Classification Search
CPC ......... B01D 17/02; F24C 14/00; F24C 15/14; F24C 15/327
USPC ............. 126/19 R; 210/538–540, 532.1, 521, 210/513
See application file for complete search history.

(56) References Cited

U.S. PATENT DOCUMENTS

| | | | |
|---|---|---|---|
| 1,672,583 A * | 6/1928 | Travers | 210/801 |
| 4,060,026 A * | 11/1977 | Lohr et al. | 99/346 |
| 4,113,617 A * | 9/1978 | Bereskin et al. | 210/742 |
| 4,128,833 A * | 12/1978 | Tsavaris | 340/603 |
| 4,145,286 A * | 3/1979 | Bereskin et al. | 210/104 |
| 5,935,449 A * | 8/1999 | Buehler et al. | 210/742 |
| 5,989,415 A * | 11/1999 | Hirs | 210/138 |
| 6,188,045 B1 * | 2/2001 | Hansen et al. | 219/401 |
| 6,435,078 B1 * | 8/2002 | Batten et al. | 99/446 |
| 6,995,341 B2 * | 2/2006 | Riefenstein et al. | 219/401 |
| 7,421,942 B2 * | 9/2008 | Hansen et al. | 99/400 |
| 2002/0170864 A1 * | 11/2002 | Batten et al. | 210/803 |
| 2006/0081592 A1 * | 4/2006 | Williams et al. | 219/401 |
| 2006/0157428 A1 * | 7/2006 | Brody | 210/801 |
| 2008/0149553 A1 * | 6/2008 | Sowerby et al. | 210/301 |
| 2010/0004786 A1 * | 1/2010 | Paine | 700/275 |

FOREIGN PATENT DOCUMENTS

| | | |
|---|---|---|
| EP | 0092851 | 4/1983 |
| EP | 1 236 425 | 2/2002 |

* cited by examiner

*Primary Examiner* — Steven B McCallister
*Assistant Examiner* — Steven Anderson, II
(74) *Attorney, Agent, or Firm* — Boyle Fredrickson, S.C.

(57) ABSTRACT

A grease removal system for a combination oven, requiring venting and condensation of steam, conducts excess grease through the same drainpipe as the steam to a water-filled condenser, then segregates the grease within a reservoir wall. In this way, a single opening may serve to remove both excess steam pressure and grease and temperature-moderated grease may be readily pumped to a convenient location.

20 Claims, 3 Drawing Sheets

GREASE HANDLING APPARATUS FOR CLOSED SYSTEM OVEN

BACKGROUND OF THE INVENTION

Commercial ovens may provide for closed system operation in which the oven volume is substantially sealed to retain heat and moisture and provide energy savings. Such closed system operation is particularly desirable for "combination ovens" that provide the ability to cook food using steam and fan driven (forced convection) hot air but may also be used in convection ovens (without steam) and rotisserie ovens.

In closed-system ovens, excess pressure within the cooking cavity caused by expanding steam and air may be vented through a condenser where the steam is cooled before exiting to the outside air, reducing heating of the kitchen environment. In common condenser designs, the steam is passed through a water bath which cools and condenses the steam. The temperature of the water bath is monitored and fresh, cool water is introduced into the water bath as the temperature rises. Excess water from the bath passes through an overflow into the building drain system.

Some foods, when cooked, produce significant quantities of grease which may be allowed to drain away from the food to be captured in a drip pan positioned at the bottom of the oven. The drip pan may be attached to a drain line to allow gravity draining of the grease into a removable collection container. One method of providing such a drainage system is described in U.S. Pat. No. 7,421,942 entitled: "Grease Collection System for Oven", assigned to the assignee of the present invention, and hereby incorporated by reference.

Gravity drainage systems for grease can be an obstacle to efficient stacking of ovens if the lowermost oven is not sufficiently elevated to permit positioning of the drain containers beneath the oven. The drainage path for excess grease is normally separate from the exit path of steam through the condenser so that the overflow water from the condenser does not discharge grease into the drains where it may congeal.

SUMMARY OF THE INVENTION

The present invention provides a grease drain system that significantly simplifies construction of a closed system oven by discharging steam and grease through the same outlet into a reservoir in the condenser assembly. Grease is removed from the condenser reservoir by a pump system efficiently operated on a pulse basis taking advantage of the accumulating capacity of the reservoir. The pump eliminates or reduces the height differentials required in pure gravity drainage systems allowing the oven to be mounted closely to the floor. The cooling water used to manage steam exhaust may also moderate temperature of the grease for better pumping and handling.

Specifically, the invention provides an oven with a cooking volume sealable with a door, the cooking volume communicating with a heater to heat the same. A condenser chamber communicates with the cooking volume through a drain opening, the condenser chamber adapted to hold a pool of water at a water level and having an exit port communicating with atmosphere outside of the cooking volume. A grease segregation wall intersects the water level to segregate grease passing through the drain opening to a reservoir area within the condenser chamber. There it can be removed by a pump connected through an opening in the condenser chamber communicating with the reservoir area so that the pump may pump grease from the reservoir area out of the condenser chamber.

It is thus one feature of at least one embodiment of the invention to provide an integrated steam condenser and grease handling system simplifying construction of the oven and the removal of grease from the oven.

The grease segregation wall may pass from a bottom of the condenser chamber to a point above the water level.

It is thus one feature of at least one embodiment of the invention to permit the free flow of steam past the separator wall to permit condenser function.

In one embodiment, the grease segregation wall may provide an upwardly open container within the condenser chamber enclosed on all sides.

It is thus one feature of at least one embodiment of the invention to better segregate the grease from the cooling water to reduce water entrained within the grease such as may increase disposal costs.

The oven may further include a baffle extending from a top of the condenser chamber to below the water level so that gases passing from the cooking volume through the condenser chamber to the exit port must pass through the pool of water.

It is thus one feature of at least one embodiment of the invention to provide a simple method of insuring condensation of the steam by forcing it to pass underneath the baffle wall into the cooling water.

In an alternative embodiment, the grease segregation wall may be spaced from a bottom of the condenser chamber to allow communication of water between the reservoir area and other areas of the condenser chamber below the grease segregation wall but to block communication of grease floating on the water between the reservoir area and the other areas of the condenser chamber.

It is thus one feature of at least one embodiment of the invention to integrate the functions of the baffle wall and grease segregation wall into a single structure for reduced cost. It is another feature of this embodiment to provide rapid cooling of expelled grease by direct contact cooling water.

The oven may further include a temperature sensor communicating with the cooking volume to measure the temperature therein and a user input console for generating electrical signals based on inputs by a user of the oven. An electric controller may communicate with the heater element, the pump, and the temperature sensor and execute a program stored in a non-transient medium to: (a) receive commands from the user indicating a cooking schedule associated with cooking times and temperatures; (b) monitor the temperature sensor and control the heater element to implement the indicated cooking schedule of cooking times and temperatures; and (c) activate the pump according to a selection of a cooking schedule indicating cooking of a grease producing foodstuff.

It is thus one feature of at least one embodiment of the invention to permit dual-mode operation of the oven both for foods that release grease while providing improved pump energy efficiency.

The command from the user may identify a foodstuff, such as chicken.

It is thus one feature of at least one embodiment of the invention to provide automatic grease removal in a manner invisible to the user that is automatically invoked based on an imputed purpose of the oven.

The pump may be activated intermittently during the cooking process for a time required to drain the reservoir.

It is thus a feature of at least one embodiment of the invention to provide for preferred energy efficiency in the operation of the pump by accumulating grease for a period of time.

The activation of the pump may be dependent upon cooking volume temperature.

It is thus a feature of at least one embodiment of the invention to provide pump operation that is sensitive to imputed rate of grease production.

The oven may include an electronic switch having an operator operable by a user for activating the pump when the electronic switch is actuated by the user.

It is thus one feature of at least one embodiment of the invention to provide manual operation of the pump for cleaning and the like.

The oven may further include a temperature sensor sensing the temperature of water in the condenser chamber and a freshwater inlet valve metering freshwater into the condenser chamber when a temperature of water in the condenser chamber exceeds a predetermined threshold.

It is thus one feature of at least one embodiment of the invention to automatically accommodate additional heat load produced by grease.

The oven may include an overflow lip defining a height of the water level above which water flows over the overflow lip.

It is thus one feature of at least one embodiment of the invention to provide a simple method of water temperature control and level control without problems of grease entering into an overflow drain.

The drain opening may be a substantially vertically extending tube and the reservoir area is directly beneath the drain opening or the drain opening may include a horizontally extending portion, for example extending within the condensation chamber. It is thus one feature of at least one embodiment of the invention to permit direct discharge of grease from the oven to eliminate potentially dangerous pooling of grease within the oven, while permitting pump management of the discharge grease.

These particular features and advantages may apply to only some embodiments falling within the claims and thus do not define the scope of the invention.

DETAILED DESCRIPTION OF THE PREFERRED EMBODIMENT

Figure 1:
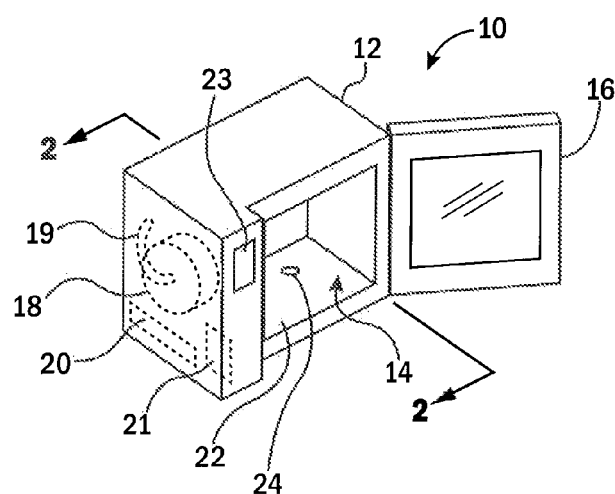
FIG. 1 is a simplified perspective view of a combination oven suitable for use with the present invention showing the elements of the convection fan, heater element (e.g., a gas heat exchanger or electric heating element), controller board, and control panel.

Referring now to FIG. 1, a closed-system commercial oven 10 suitable for providing steam and convection air cooking provides a housing 12 defining a cooking volume 14 open toward a front of the housing 12. The cooking volume 14 is accessible through a door 16 connected by a hinge at one vertical side of the cooking volume 14 to sealingly close that cooking volume 14 during cooking operations. A latch assembly (not shown) may hold the door 16 in the sealed position or may be released to allow the door 16 to open.

Positioned within the housing 12 and communicating with the cooking volume 14 is a forced convection fan 18 providing a stream of air into the cooking volume 14 and across a heater element 20 (shown schematically) providing heat for cooking items, in the cooking volume 14 and for vaporizing steam. The heater element may be an electric heating element or a heat exchanger receiving heat from a gas flame or the like. The steam may be produced by a valve-controlled water jet 19 typically impinging on the fan 18 and a portion of the heater element 20 proximate to the fan 18. Ovens of this type are commercially available from the Alto-Shaam Inc. of Menomonee Falls, Wis. and are described generally in U.S. Pat. No. 6,188,045 "Combination Oven with Three Stage Water Atomizer" hereby incorporated by reference.

A controller board 21 within the housing 12 may provide an electronic computer or microcontroller receiving instructions from a control panel 23 accessible on the front of the oven 10, and having, for example, membrane switches that may be activated by user. As will be discussed in greater detail below, the controller board 21 generally provides an electronic computer executing a stored program to control the heater element 20, fan 18, and the waterjet 19, turning them on and off as necessary to implement a particular cooking schedule.

The cooking volume 14 may further provide for a removable drip pan 22 being a metal tray fitting adjacent to the bottom of the cooking volume 14 and having a drainage aperture 24 through which collected grease and oil from cooked product within the cooking volume 14 may pass.

Figure 2:
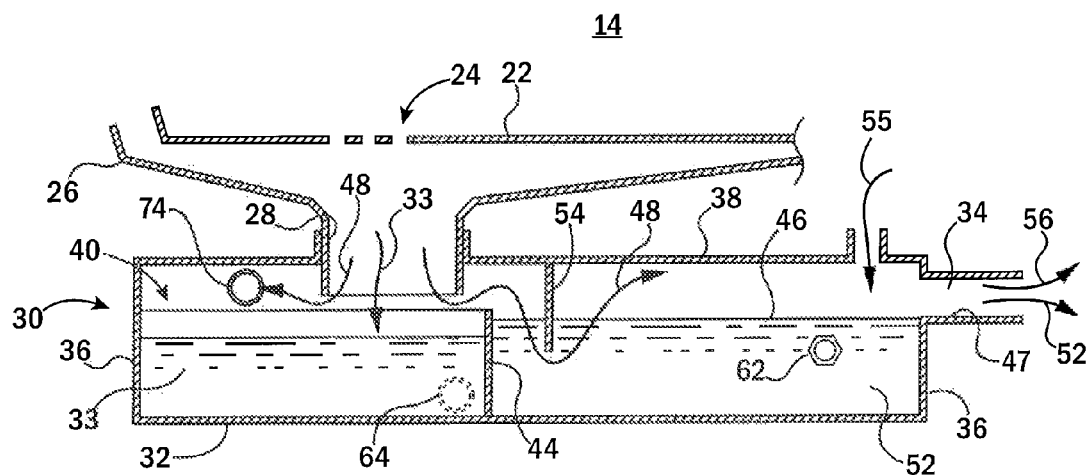
FIG. 2 is a fragmentary cross-section along line 2-2 of FIG. 1 showing a first embodiment of the grease management system of the present invention providing for the cooling of escaping steam and collection of grease through a common drain opening.

Referring now to FIG. 2, the drip pan 22 is positioned with respect to a bottom wall 26 of the cooking volume 14 so that the drainage aperture 24 is located directly above a drainpipe 28, the latter being a short tube extending vertically downwardly from the bottom wall 26 to a condenser chamber 30 positioned beneath the bottom wall 26. The drainpipe 28 allows grease and oil 33 passing through the drainage aperture 24 to enter the condenser chamber 30 under the influence of gravity. In an alternative embodiment (not shown) the drainpipe 28 may extend horizontally for a short distance before or after it is received within the condenser chamber 30.

Figure 3:
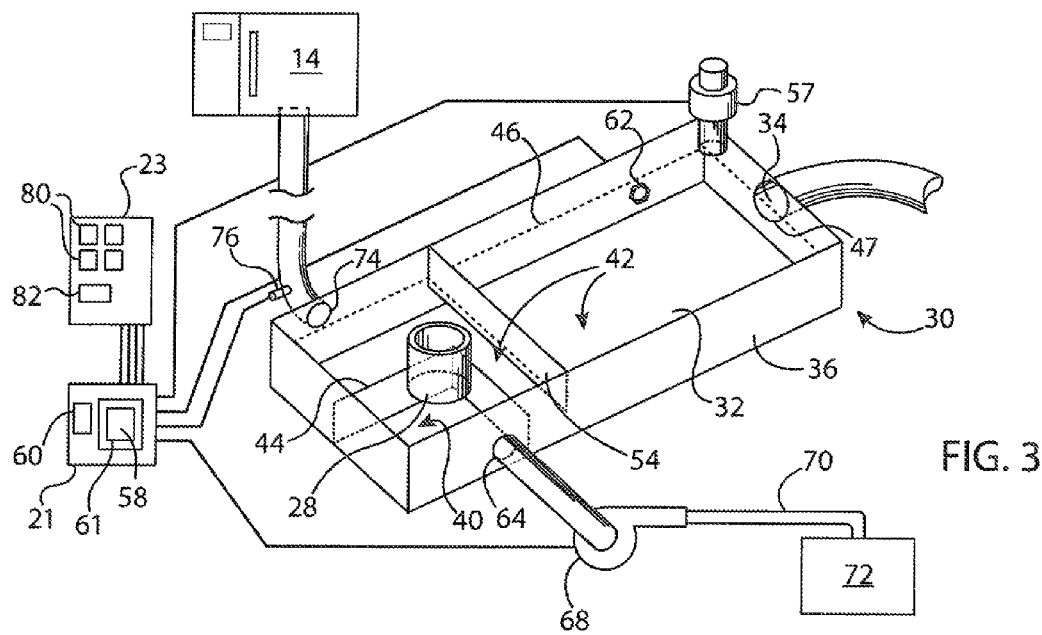
FIG. 3 is an orthographic view of the grease management system showing connection to other oven elements including the controller board.

Referring now also to FIG. 3, the condenser chamber 30 provides a generally enclosed box having a bottom wall 32 sloping downwardly from an end closest to the drainpipe 28 to an opposite end adjacent to an, exit port 34. Upstanding sidewalls 36 around the periphery of the bottom wall 32 retain, a pool of water having a water level 46 and accumulated grease within the condenser chamber 30 as will be described. These upstanding sidewalls 36 are joined at their upper edges to a generally horizontal upper wall 38 adjacent to a bottom of the cooking volume 14 and having an opening for receiving the drainpipe 28 therethrough. The lower end of the drainpipe 28 passing into the condenser chamber 30 stops above the bottom wall 32 and above a water level 46.

The volume of the condenser chamber 30 is divided into a reservoir area 40 directly beneath the drainpipe 28 and a non-reservoir area 42 being the remaining area outside of the reservoir area within the condenser chamber 30. The reservoir area 40 may be defined by upstanding reservoir walls 44 joining with the sidewalls 36 to define an upwardly open container closed on all sides and positioned beneath the drainpipe 28. The reservoir walls extend upward from the bottom wall 26 to a position above a water level 46 but below the upper wall 38 so as to provide a path of steam 48 from the drainpipe 28 past the reservoir walls 44 to the exit port 34. The exit port 34 generally connects to the sanitary sewer line but with some venting arrangement which allows the escape of gases. For example, the exit port 34 may discharge onto a floor drain or the like. As noted, it is desirable that excess grease not be introduced into the sanitary sewer such as may create clogging problems.

Generally grease 33 will drop through the drainpipe 28 to be retained by the reservoir area 40 whereas steam 48 will not be so constrained but will pass into the non-reservoir area 42. The non-reservoir area 42 will be filled with cool water 52 and controlled in height to the water level 46. A baffle plate 54 may extend downward from the upper wall 38 through the water level 46 to beneath the level of the water 52 but above the bottom wall 32. The baffle plate 54 thereby forces heated air and steam 48 passing from the drainpipe 28 to the exit port 34 to pass through the cool water 52 thus condensing the steam and cooling the associated air 56 exiting the exit port 34 as indicated by an arrow.

The water 52 is maintained at a cool temperature by a freshwater inlet valve 57 adding makeup water 55 through an opening in the upper wall 38. The freshwater inlet valve 57 is under the control of the controller board 21 which may also communicate with a temperature gauge 62 so that additional water is added through valve 57 only when the temperature of the existing water 52 rises above a certain amount. As water is admitted through valve 57 excess water 52 drains out through the exit port 34 as indicated by arrow, the lower edge of which provides an overflow lip 47 defining the water level 46.

The reservoir area 40 communicates through a grease discharge opening 64 passing through a sidewall 36 to discharge accumulated grease 33 and pass it to a suction pump 68. For this purpose the grease discharge opening 64 in this embodiment may be positioned near the bottom wall 32. The suction pump 68 may pump the grease through a conduit 70 of arbitrary length to a collection vessel 72, for example, removed from the oven 10 for convenient access. The removal path may be substantially horizontal allowing grease to be readily collected from an oven 10 placed closely adjacent to a floor that would otherwise preclude the placement of a grease collection bucket at a point lower than the drainpipe 28. The suction pump 68 may also communicate with the controller board 21 to be controlled thereby.

Steam passing through the drainpipe 28 may also pass into a steam collection port 74 that may recirculate back to the oven cavity. The steam collection port 74 may hold a temperature sensor 76 communicating with the controller board 21 which may be used to provide steam temperature information useful for control of the oven 10.

Figure 4:
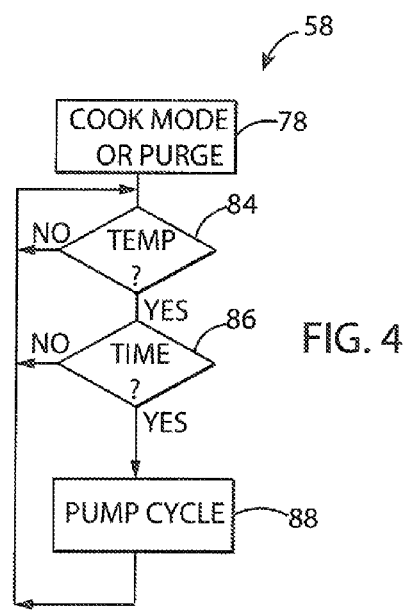
FIG. 4 is a simplified flowchart of the program executed by the controller board of FIG. 1 for managing grease.

Referring now to FIGS. 3 and 4, the controller board 21 may execute a stored program 58 held in a memory 61 using a processor 60 communicating with memory 61. The program 58 may selectively operate the pump 68 both on a periodic basis during the cooking of foods that express grease and only in cooking modes associated with foods that express grease in order to conserve energy. The program 58 implements this functionality by communicating with a cooking program also executed by the controller board 21 and the control panel 23. The cooking program generally includes and implements pre-stored schedules of cooking times and temperatures for different foods. The cooking program may also allow manual setting of temperatures and times.

As indicated by process block 78, a pump cycle in which pump 68 is turned on for a brief period of time may be initiated by indication of a particular cooking mode captured by the cooking program through cooking mode buttons 80 on control panel 23, such as may indicate, for example, a desired cooking schedule for cooking of chicken. In this regard, a particular button 80 may be labeled with indicia indicating roasted chicken, for example. Alternatively, a pump cycle may be initiated by pressing of a special grease purge button 82 indicating a desire to manually operate the suction pump 68.

Upon either such indication, the program 58 determines whether the temperature of the oven is sufficiently high for the generation of grease (and its mobility) as indicated by decision block 84. If not the program loops at this point.

If the temperature is sufficient, the program 58 checks to see whether the pump 68 has been operated recently according to a stored time value indicating its last operation per decision block 86. The amount of time elapsed since the last operation of the pump 68 is compared to empirically developed data indicating approximate rate of filling of the reservoir area 40 as informed by the cooking mode of process block 78. If the suction pump 68 has been operated within this interval, the program 58 may loop at decision block 86 until this time has elapsed.

If the time elapsed since the last running of the suction pump 68 exceeds the stored filling rate interval of the reservoir area 40, the program 58 proceeds to process block 88 and the pump is run for a fixed period of time sufficient to fully empty the reservoir area 40. In this way, the pump 68 does not need to operate continuously and power is conserved. For example, the pump 68 may be activated first when the temperature of the oven is within five degrees of a set temperature on intervals of 20 minutes for a pumping duration of 60 seconds.

Referring to FIGS. 4 and 2, the time delay between pump cycles implemented by decision block 86 provides a temperature acclamation of the discharge grease to more moderate temperatures. This temperature moderation of the grease 33 reservoir area 40 may occur through conduction, for example, through reservoir walls 44 and bottom wall 32 and allows the grease 33 to cool sufficiently to be readily handled and yet not so cool much as to prevent easy pumping by the suction pump 68.

Figure 5:
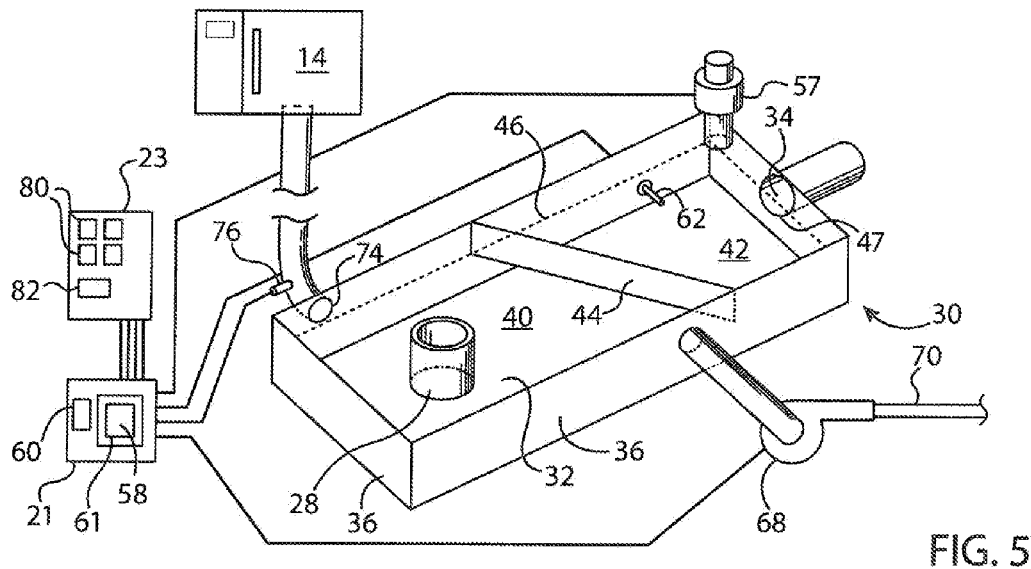
FIG. 5 is a figure similar to that of FIG. 3 of an alternative embodiment of the present invention providing increased cooling of the grease.
Figure 6:
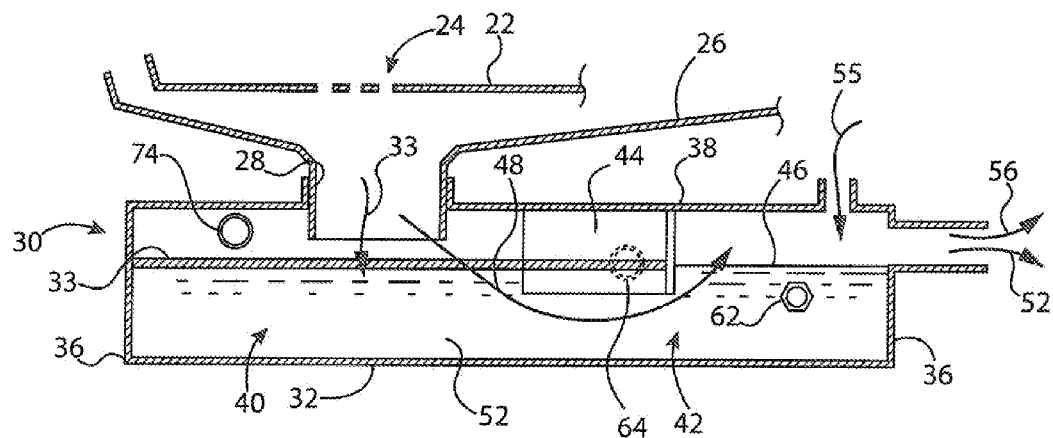
FIG. 6 is a figure similar to that of FIG. 2 of the alternative embodiment of FIG. 5.

Referring now to FIGS. 5 and 6, in an alternative embodiment, the reservoir walls 44 separating the reservoir area 40 from the non-reservoir area 42 may also implement the function of the baffle plate 54. This is done by positioning the reservoir walls 44 to extend downward from the upper wall 38 below the water level 46 but above the bottom wall 32. This embodiment segregates the grease 33 by exploiting the fact that the grease 33 will have lower density than the water 52 and thus will float on its surface and can be blocked by a reservoir wall 44 that does not extend fully to the bottom wall 32 of the condensation chamber 30. In this embodiment, the grease discharge opening 64 may be positioned approximately at the water level 46. This embodiment provides more intimate contact between the grease 33 and the water to provide improved cooling and eliminates an element of the chamber 30.

Certain terminology is used herein for purposes of reference only, and thus is not intended to be limiting. For example, terms such as "upper", "lower", "above", "below", "clockwise", and "counterclockwise" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a controller, computer or processor or its equivalent can be understood to include one or more computational devices including microprocessors, field programmable gate arrays, and application specific integrated circuits that can implement state aware logic and that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

We claim:

1. An oven comprising:
   an oven housing defining a cooking volume and having a door providing access to a cooking volume and sealing the cooking volume when the door is in a closed position;
   a heater communicating with the cooking volume to heat the same;
   a condenser chamber communicating with the cooking volume through a drain opening, the condenser chamber having an exit port communicating with atmosphere outside of the cooking volume and the condenser chamber adapted to hold a pool of water of the condenser chamber at a water level;
   a grease segregation wall separating the condenser chamber into a first collection chamber and a second collection chamber and intersecting the water level to segregate grease passing through the drain opening to a reservoir area within the first collection chamber wherein the drain opening is in the first collection chamber and the exit port is in the second collection chamber and the grease segregation wall is adapted to require steam to flow from the drain opening to pass under the grease segregation wall;
   a pump communicating through an opening in the first collection chamber with the reservoir area to pump grease from the reservoir area out of the first collection chamber; and
   a freshwater inlet, to introduce freshwater directly into the second collection chamber from a source external to the condenser chamber, located in the second collection chamber and adapted to provide freshwater to the second collection chamber to control the temperature of the contained water without passing through grease accumulated in the first collection chamber.

2. The oven of claim 1 wherein a second grease segregation wall passes from a bottom of the condenser chamber to a point above the water level.

3. The oven of claim 1 wherein the grease segregation wall provides an upwardly open container within the condenser chamber enclosed on all sides.

4. The oven of claim 1 wherein the grease segregation wall extends from a top of the condenser chamber to below the water level so that gases passing from the cooking volume through the condenser chamber to the exit port must pass through the pool of water.

5. The oven of claim 1 wherein the grease segregation wall is spaced from a bottom of the condenser chamber to allow communication of water between the reservoir area and other areas of the condenser chamber below the grease segregation but to block communication grease floating on the water between the reservoir area and the other areas of the condenser chamber.

6. The oven of claim 1 further including an electronic switch having an operator operable by a user for activating the pump when the electronic switch is actuated by a user.

7. The oven of claim 1 further including:
   a temperature sensor communicating with the cooking volume to measure the temperature therein;
   a user input console for generating electrical signals based on inputs by a user of the oven; and
   an electric controller communicating with the heater element, the pump, and the temperature sensor and executing a program stored in a non-transient medium to:
   (a) receive commands from the user indicating a cooking schedule associated with cooking times and temperatures;
   (b) monitor the temperature sensor and control the heater element to implement the indicated cooking schedule of cooking times and temperatures;
   (c) activate the pump according to a selection of a cooking schedule indicating cooking of a grease producing foodstuff.

8. The oven of claim 7 wherein the command from the user identifies a foodstuff.

9. The oven of claim 8 wherein the identified foodstuff is chicken.

10. The oven of claim 1 wherein the pump is activated intermittently during the cooking process for a time required to drain the reservoir.

11. The oven of claim 1 wherein activation of the pump is dependent upon cooking volume temperature.

12. The oven of claim 1 further including a temperature sensor sensing the temperature of water in the condenser chamber and a freshwater inlet valve metering freshwater into the condenser chamber when a temperature of water in the condenser chamber exceeds a predetermined threshold.

13. The oven of claim 1 further including an overflow lip defining a height of the water level above which water flows over the overflow lip.

14. The oven of claim 1 wherein the drain opening is a substantially vertically extending tube and the reservoir area is directly beneath the drain opening.

15. A method of operating an oven:
   the method comprising:
   (a) providing an oven having;
   an oven housing defining a cooking volume and having a door providing access to a cooking volume and sealing the cooking volume when the door is in a closed position:
   a heater communicating with the cooking volume to heat the same;

a condenser chamber communicating with the cooking volume through, a drain opening, the condenser chamber having an exit port communicating with atmosphere outside of the cooking volume and the condenser chamber adapted to hold a pool of water of the condenser chamber at a water level;

a grease segregation wall separating the condenser chamber into a first collection chamber and a second collection chamber and intersecting the water level to segregate grease passing through the drain opening to a reservoir area within the first collection chamber wherein the drain opening is in the first collection chamber and the exit port is in the second collection chamber and the grease segregation wall is adapted to require steam to flow from the drain opening to pass under the grease segregation wall;

a pump communicating through an opening in the first collection chamber with the reservoir area to pump grease from the reservoir area out of the first collection chamber; and a freshwater inlet, to introduce freshwater directly into the second collection chamber from a source external to the condenser chamber, located in the second collection chamber and adapted to provide freshwater to the second collection chamber to control the temperature of the contained water without passing through grease accumulated in the first collection chamber;

(b) filling the condenser chamber with water to the water level (c) heating the cooking volume with the heater to cause grease to enter the condenser chamber;

(d) blocking grease from passing to file exit port; and (e) pumping grease from the reservoir area out of the first collection chamber.

16. The method of claim 15 further comprising the step of:

(e) opening a freshwater inlet valve to allow freshwater into the second collection chamber when a temperature of the contained water exceeds a predetermined threshold.

17. The oven of claim 1 further including a controller communicating with a temperature sensor sensing the temperature of the contained water and the freshwater inlet to meter the flow of freshwater through the inlet when a temperature of the contained water exceeds a predetermined threshold.

18. The oven of claim 1 further including a steam collection port that recirculates steam of the condenser chamber back into the cooking volume.

19. The oven of claim 18 further including a temperature sensor of the steam collection port for collecting temperature information of the steam.

20. An oven comprising:

an oven housing defining a cooking volume and having a door providing access to a cooking volume and sealing the cooking volume when the door is in a closed position;

a heater communicating with the cooking volume to heat the same;

a condenser chamber communicating with the cooking volume through a drain opening, the condenser chamber having an exit port communicating with atmosphere outside of the cooking volume and adapted to hold a pool of water at a water level;

a grease segregation wall intersecting the water level to segregate grease passing through the drain opening to a reservoir area within the condenser chamber;

a pump communicating through an opening in the condenser chamber with the reservoir area to pump grease from, the reservoir area out of the condenser chamber;

a freshwater inlet providing freshwater directly to the condenser chamber to control the temperature of the contained water;

a steam collection port that recirculates steam of the condenser chamber back into the cooking volume; and a temperature sensor of the steam collection port for collecting temperature information of the steam.

\* \* \* \* \*